United States Patent
Hamynen et al.

(10) Patent No.: US 8,301,159 B2
(45) Date of Patent: *Oct. 30, 2012

(54) DISPLAYING NETWORK OBJECTS IN MOBILE DEVICES BASED ON GEOLOCATION

(75) Inventors: Kimmo Hamynen, Feldmeilen (CH); Pasi Korhonen, Espoo (FI); Markus Kahari, Helsinki (FI); Antti Sorvari, Itasalmi (FI); Yka Huhtala, Helsinki (FI); David Murphy, Helsinki (FI); Joonas Paalasmaa, Helsinki (FI)

(73) Assignee: Nokia Corporation, Espoo (FI)

( * ) Notice: Subject to any disclaimer, the term of this patent is extended or adjusted under 35 U.S.C. 154(b) by 72 days.

This patent is subject to a terminal disclaimer.

(21) Appl. No.: 12/623,501

(22) Filed: Nov. 23, 2009

(65) Prior Publication Data

US 2010/0161658 A1 Jun. 24, 2010

Related U.S. Application Data

(63) Continuation of application No. 11/328,298, filed on Jan. 9, 2006, now Pat. No. 7,720,436, and a continuation-in-part of application No. 11/791,629, filed as application No. PCT/FI2004/050199 on Dec. 31, 2004.

(51) Int. Cl.
*H04W 24/00* (2009.01)
(52) U.S. Cl. ............... 455/456.1; 455/456.2; 455/456.3
(58) Field of Classification Search .......... 455/414.1, 455/414.2, 412.2, 404.2, 456.1, 456.2, 456.3, 455/457, 566; 348/14.01, 14.16; 705/26, 705/27
See application file for complete search history.

(56) References Cited

U.S. PATENT DOCUMENTS

| | | | |
|---|---|---|---|
| 5,884,224 | A | 3/1999 | McNabb |
| 6,064,749 | A | 5/2000 | Hirota et al. |
| 6,173,239 | B1 | 1/2001 | Ellenby |
| 6,181,302 | B1 | 1/2001 | Lynde |
| 6,222,583 | B1 | 4/2001 | Matsumura et al. |
| 6,282,362 | B1 | 8/2001 | Murphy |
| 6,377,793 | B1 | 4/2002 | Jenkins |
| 6,381,540 | B1 | 4/2002 | Beason |
| 6,396,475 | B1 | 5/2002 | Ellenby |

(Continued)

FOREIGN PATENT DOCUMENTS

DE 10156832 6/2003

(Continued)

OTHER PUBLICATIONS

Zhang et al., "Mobile Computing and Industrial Augmented Reality for Real-Time Data Access", IEEE, 2001, 6 pages.

(Continued)

*Primary Examiner* — Jean Gelin
(74) *Attorney, Agent, or Firm* — Ditthavong Mori & Steiner, P.C.

(57) ABSTRACT

Displaying network content searches on mobile devices involves obtaining results of a network content request via a mobile device. A geolocation of at least one object associated with the results of the network content request is also obtained. A scene is viewed in a camera view of the mobile device. A virtual location is determined in the camera view. The virtual location represents the actual location of the object relative to the scene contained in the camera view. A graphic representing the object is then displayed at the virtual location in the camera view.

21 Claims, 10 Drawing Sheets

U.S. PATENT DOCUMENTS

| | | | |
|---|---|---|---|
| 6,414,696 | B1 | 7/2002 | Ellenby et al. |
| 6,553,308 | B1 | 4/2003 | Uhlmann |
| 6,597,406 | B2 | 7/2003 | Gloudemans et al. |
| 6,653,990 | B1 | 11/2003 | Lestruhaut |
| 6,714,860 | B1 | 3/2004 | Wawra et al. |
| 6,765,569 | B2 | 7/2004 | Neumann et al. |
| 6,795,768 | B2 | 9/2004 | Bragansa |
| 6,895,126 | B2 | 5/2005 | Di Bernardo et al. |
| 7,146,188 | B2 | 12/2006 | Deeds |
| 7,457,705 | B2 | 11/2008 | Takahashi et al. |
| 7,707,239 | B2 * | 4/2010 | Anderson et al. ............ 709/202 |
| 7,720,436 | B2 * | 5/2010 | Hamynen et al. ............ 455/13.1 |
| 2002/0046212 | A1 | 4/2002 | Meifu et al. |
| 2002/0052684 | A1 | 5/2002 | Bide |
| 2002/0140745 | A1 | 10/2002 | Ellenby |
| 2003/0027553 | A1 | 2/2003 | Davidson et al. |
| 2003/0061001 | A1 | 3/2003 | Willins et al. |
| 2003/0087650 | A1 | 5/2003 | Aarnio |
| 2003/0218638 | A1 | 11/2003 | Goose |
| 2004/0119986 | A1 | 6/2004 | Benke |
| 2004/0221244 | A1 | 11/2004 | Baldino |
| 2005/0162523 | A1 | 7/2005 | Darrell et al. |
| 2006/0002607 | A1 | 1/2006 | Boncyk et al. |
| 2006/0161379 | A1 | 7/2006 | Ellenby et al. |
| 2006/0190812 | A1 | 8/2006 | Ellenby et al. |
| 2007/0024527 | A1 | 2/2007 | Heikkinen et al. |
| 2007/0027763 | A1 | 2/2007 | Yen et al. |
| 2007/0106721 | A1 | 5/2007 | Schloter |
| 2007/0162942 | A1 | 7/2007 | Hamynen et al. |
| 2008/0046320 | A1 | 2/2008 | Farkas et al. |
| 2008/0071559 | A1 | 3/2008 | Arrasvuori |
| 2008/0268876 | A1 | 10/2008 | Gelfand |
| 2009/0061901 | A1 | 3/2009 | Arrasvuori et al. |

FOREIGN PATENT DOCUMENTS

| | | |
|---|---|---|
| EP | 0867690 | 9/1998 |
| EP | 1199646 | 4/2002 |
| JP | 1026767 | 10/1998 |
| JP | 2003283664 | 10/2003 |
| JP | 2005-121650 | 5/2005 |
| KR | 20040006750 | 1/2004 |
| KR | 20040008241 | 1/2004 |
| KR | 20040028880 | 4/2004 |
| WO | WO96/30803 | 10/1996 |
| WO | WO 00/49530 | 8/2000 |
| WO | WO2005124594 | 12/2005 |
| WO | WO2006/070047 | 7/2006 |

OTHER PUBLICATIONS

Office Action with translation dated Dec. 24, 2010 from Chinese Patent Application No. 200780004770.1, 18 pages.

Office Action with translation dated Feb. 28, 2011 from Korean Patent Application No. 10-2008-7019343, 6 pages.

U.S. Appl. No. 09/572,677, filed May 16, 2000, Suomela.

Office Action dated Jun. 7, 2010 from Russian Application No. 2008132293, 3 pages.

Notice of Allowance dated Jan. 12, 2010 from U.S. Appl. No. 11/328,298, 4 pages.

Nov. 20, 2009 Notice of Allowance dated Nov. 20, 2009 from U.S. Appl. No. 11/328,298, 6 pages.

Office Action Response dated Aug. 17, 2009 from U.S. Appl. No. 11/328,298, 15 pages.

Office Action dated Mar. 16, 2009 from U.S. Appl. No. 11/328,298, 11 pages.

Office Action dated Aug. 26, 2010 from KR Application No. 10-2008-7019343, 5 pages.

BenAbdelkader et al., "Person Identification using Automatic Height and Stride Estimation", http://research.microsoft.com/~rcutler/Gait/icpr2002.pdf, May 3, 2002.

Zhu et al., "Personalized In-store E-Commerce with the PromoPad: an Augmented Reality Shopping Assistant", The Electronic Journal for E-Commerce Tools & Applications, Feb. 2004.

Nikias et al., "Total Immersion", OE Magazine, Jul. 2001.

Wiegand, "Calibration-free Augmented Reality", Jan. 21, 2005.

"IBM's HotVideo Enables Embedded Hyperlinks in Video", CBR Online, Issue 3310, Dec. 12, 1997.

Campbell et al., "Combining Positional Information with Visual Media", The $3^{rd}$ International Symposium on Wearable Computers, Oct. 1999, pp. 203-205.

Lenczner, "Wifidog Blowing up More", mtl3p Blog, Apr. 3, 2006.

Jonietz, "TR10: Augmented Reality", Technology Review, Mar. 12, 2007.

Kahara et al., "MARA—Sensor Based Augmented Reality System for Mobile Imaging Device", Nokia Research Center, Mar. 2006.

Snavely et al., "Photo tourism: Exploring Collections in 3D", printed from internet Dec. 2, 2009.

Microsoft Live Labs, "What is Photosynth", printed from internet Dec. 2, 2009.

Majakangas et al., "Touch a Phone, Touch a Friend: Using RFID and Visual Tags with JSR 257", 2006 JavaOne Conference.

Office Action with translation dated Jul. 29, 2011 from Korean Patent Application No. 10-2008-7019343, 7 pages.

Office Action with translation dated Jul. 7, 2011 from Chinese Patent Application No. 200780004770.1, 21 pages.

Office Action with translation dated Nov. 3, 2011 from Chinese Patent Application No. 200780004770.1, 6 pages.

Office Action for related Chinese Application No. 200780004770.1 dated Jul. 3, 2012, pp. 1-6.

* cited by examiner

DISPLAYING NETWORK OBJECTS IN MOBILE DEVICES BASED ON GEOLOCATION

CROSS-REFERENCE TO RELATED APPLICATIONS

This is a continuation application of application Ser. No. 11/328,298, filed Jan. 9, 2006 now U.S. Pat. No. 7,720,436, now U.S. Patent Publication No. 2007/0162942, the contents of which is incorporated herein by reference in its entirety. This also claims the benefit of and is a continuation-in-part of application Ser. No. 11/791,629 filed under the provisions of 35 USC 371 on May 24, 2007, now U.S. Patent Publication No. 2007/0268392, which is a United States national phase application of International Application No. PCT/FI04/50199 filed Dec. 31, 2004.

FIELD OF THE INVENTION

This invention relates in general to computer networking, and more particularly to displaying network content searches on mobile devices.

BACKGROUND OF THE INVENTION

The ubiquity of cellular phones and similar mobile electronics has led to demands for ever more advanced features in these devices. One feature that is of particular value in such devices is the ability to connect to the Internet and other networks. In near future, many aspects of the global networks such as the World Wide Web will be shifting to cater to mobile device users. Typically, mobile adaptations for Web content focused on dealing with the limited bandwidth, power, and display capabilities inherent in mobile devices. However, the fact that mobile devices can be used to provide data from wherever the user is located will provide additional opportunities to adapt Web content and increase the value of such content to the end user.

Mobile phones are increasingly becoming multipurpose devices. For example, it is becoming much more common for mobile phones to include an integrated camera. People are getting used to the fact they are carrying a camera with them, and can always snap a photo whenever they desire. Additionally, some cell phones are carrying advanced sensors for various uses. Sensor technology has evolved rapidly, and various sensors can be economically included into mobile phones. One example of this is location sensors such as Global Positioning Satellite (GPS) receivers and digital compasses that allow a user to determine their exact location. These location sensors can be used for traditional applications, such as mapping and guidance. It is also possible that successful integration of location sensing features with networking applications can be used to provide more focused and relevant content to the mobile device user. Therefore, networking applications that can use mobile device location data will be particularly useful.

SUMMARY OF THE INVENTION

To overcome limitations in the prior art described above, and to overcome other limitations that will become apparent upon reading and understanding the present specification, the present invention discloses a system, apparatus and method for displaying network content searches on mobile devices.

In accordance with one embodiment of the invention, a method involves obtaining results of a network content request via a mobile device. A geolocation of at least one object associated with the results of the network content request is determined. A camera view associated with the mobile device is determined, as is a virtual location in the camera view that represents the actual location of the object relative to a scene contained in the camera view. A graphic is displayed via the mobile device at the virtual location in the camera view, the graphic representing the object.

In more particular embodiments, determining the virtual location in the camera view involves determining the location within a visible image captured by the mobile device. Displaying the graphic may involve overlaying the graphic onto the visible image. Determining the virtual location in the camera view of the mobile device may involve determining a geolocation of the mobile device, such as by accessing a global positioning satellite receiver via the mobile device. Determining the geolocation of the mobile device may also involve determining an orientation of the mobile device relative to the earth's surface, such as by determining a compass heading of the camera view and/or determining one or more rotation angles of the mobile device relative to the earth's surface.

In other, more particular embodiments, the method further involves selectably displaying via the mobile device at least one of: a) a three-dimensional view that includes the scene overlaid with the graphic; and b) a two-dimensional view that includes a first graphic representing the object and a second graphic representing a location of the mobile device relative to the object. A map may be selectably overlaid with the first and second graphics in the two-dimensional view. The method may involve switching between the three-dimensional view and the two-dimensional view based on an orientation of the mobile device relative to the earth' surface. In another arrangement, the method involves selectably displaying via the mobile device a two-dimensional view that includes an arrow indicating the location of the object relative to the location of the mobile device.

In other, more particular embodiments, the method further involves playing a sound in a headphone of the mobile device. The sound is spatially-oriented to direct a user of the device to the object. In one arrangement, the method further involves determining a distance between the at least one object and the mobile terminal, and modifying a characteristic of the sound based on the distance.

In other, more particular embodiments, obtaining the results of the network content request via the mobile device involves submitting a search query to a server via the network, and obtaining the results of the network content request from the server in response to the search query. The query may be formed by detecting text in the scene using optical character recognition, and forming the query based on the text.

In other, more particular embodiments, the method further involves determining a distance between the at least one object and the mobile terminal, and modifying visual characteristics of the graphic based on the distance. The method may also further involve providing the ability to select the graphic via the mobile device, and displaying supplementary data related to the object via the mobile device in response to the selection of the graphic.

In another embodiment of the invention, an apparatus includes a camera, a display; a network interface capable of communicating via a network, and a processor coupled to the network interface, the camera, and the display. Memory is coupled to the processor. The memory includes instructions that cause the processor to submit a network content request via the network interface. Results of the network content request are obtained via the network interface, and a geolocation of at least one object associated with the results is determined. A scene in a view of the camera is determined, and a virtual location in the view that represents the actual location of the object relative to the scene is determined. A graphic is displayed in the display at the virtual location in the view; the graphic represents the object. In another, more particular embodiment, the memory further includes a Web browser. The instructions are configured as a plug-in to the Web browser.

In another embodiment of the invention, a computer-readable medium has instructions stored thereon which are executable by a data processing arrangement capable of being coupled to a network. The instructions are for performing steps including submitting a network content request via the network; obtaining results of the network content request via the network; determining a geolocation of at least one object associated with the results; detecting a scene in a camera view of the data processing arrangement; determining a virtual location in the camera view that represents the actual location of the object relative to the scene; and displaying a graphic that represents the object at the virtual location in the camera view via a display of the data processing arrangement.

In another embodiment of the invention, a system, includes means for obtaining results of a network request at a mobile device; means for determining a geolocation of at least one object associated with the results; and means for displaying a graphic representing the object in a location of a three-dimensional scene representing the object's actual location relative to the scene based on the geolocation of the object.

In another embodiment of the invention, a method involves determining a geolocation of a mobile device. The geolocation of the mobile device is embedded in a content request. The content request is submitted via a network, and the mobile device receives a document capable of being displayed via the mobile device in response to the content request. The document is tailored based on the geolocation of the mobile device.

In other, more particular embodiments, embedding the geolocation of the mobile device in the content request involves embedding the geolocation in a Hypertext Transport Protocol (HTTP) request, such as in an HTTP header. The method may also involve embedding a location refresh indicator in the document, and causing the mobile terminal to request a new version of the document based on a comparison of the location refresh indicator and the geolocation of the mobile device. In other, more particular embodiments, the method may also involve embedding a location aware object in the document; and changing a display characteristic of the location aware object based on geolocation changes of the mobile device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention involves merging location data from a mobile electronics device with specific network data such as Web pages. In one example, images available from a portable camera device are combined with network data in order to locate goods, services, or other points of interest. A camera phone or similar device can be used to view a scene such as a city street. By using various devices that may be embedded in the camera phone (e.g., GPS receivers, digital compass, accelerometers), the camera phone can determine the spatial orientation of the camera's viewfinder. The device may also be able to search network data related to objects (e.g., buildings, landmarks) that have location data associated with them. This localized network data can be combined with the spatial orientation and location data of the phone. An overlay of search results can be overlaid on the camera phone image. The overlay shows the location of the objects relative to the scene contained in the image.

The ability to continuously monitor the location of the device also means that image overlays can be combined with other features that assist the user in finding a target location.

In one example, a two-dimensional map can be displayed on the device showing instructions on how to proceed to the target. In yet another example, 3-D audio can be provided by the mobile device to assist a user in finding a location associated with network content.

The localization of search results can be used to provide additional enhancements to portable computing network applications. For example, the behavior of a Web page or other application can vary based on the current physical location of the device. Determining the location of a mobile user means that Web content delivered to those users can be more optimized to that specific location. Often, it is most useful to have information about places and situations where the content is the most valuable, particularly those places and situations that are close to the current user's location. Location information can be used to more accurately select Web objects and content in the context of browsing or other Internet applications.

Figure 1:
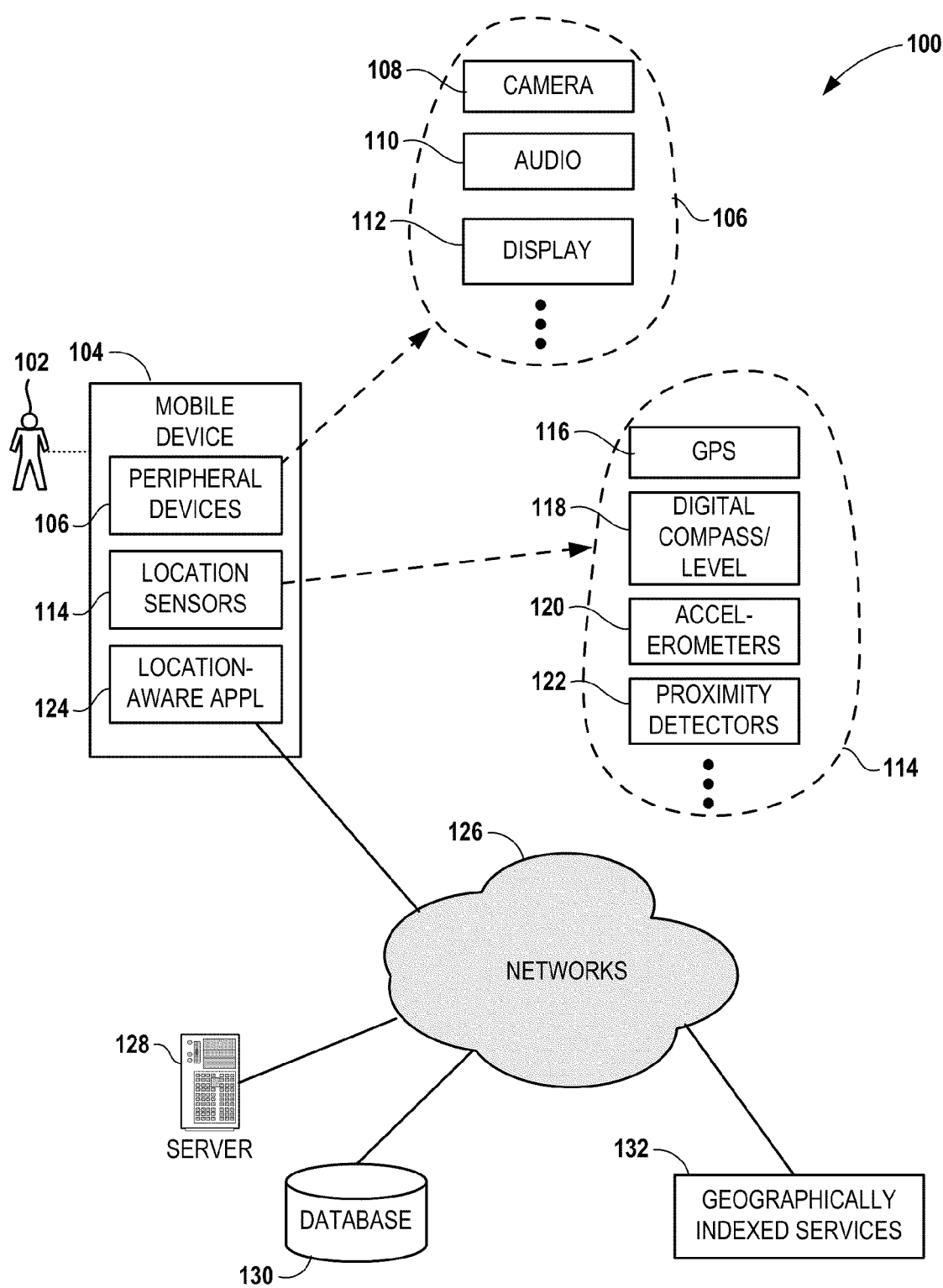
FIG. 1 is a block diagram of a system according to embodiments of the present invention.

In reference now to FIG. 1, a system 100 according to embodiments of the present invention is illustrated. A user 102 has a mobile device 104 that may be used for any type of portable data communications. Typical mobile devices 104 include cellular phones and PDAs, but may also include laptop computers, portable music/video players, automotive electronics, etc. The functions of the mobile device 104 may also be included in apparatuses that are not typically mobile, such as desktop computers.

The mobile device may include any number of peripheral devices 106 for processing inputs and outputs. For example, the peripheral devices 106 may include a camera 108, audio equipment 110 (e.g., microphones and speakers), and displays 112 (e.g., LCD and LED displays). The mobile device 104 may also contain location sensing devices 114. The location sensing devices 114 may include any combination of apparatus that enable the mobile device 104 to determine its absolute or relative position. Typical location sensing devices include GPS 116, digital compass/level 118, accelerometers 120, and proximity detectors 122 (e.g., Radio Frequency ID tags, short-range radio receivers, infrared detectors). It will be appreciated that the location sensors 114 may be considered a particular class of peripheral devices 106, and the categorization of such devices is only illustrative and not meant to limit the purposes for which the devices may be employed.

The mobile device 104 contains functional modules that enable it to perform locality-specific enhancements as described herein. The mobile device 104 includes location-aware applications 124 that are enabled to take advantage of the peripheral device 106 and location sensors 114. The location-aware applications 124 may also be capable of accessing one or more networks 126 via wired or wireless network interfaces of the mobile device 104. The networks 126 may include any combination of private and public networks, and may range in size from small ad hoc peer-to-peer networks to a global area network such as the Internet. Generally, the networks 126 provide network data services to the mobile device 104, as represented by the server 128 and database 130 that are accessible via the networks 126.

The data obtained at the mobile device 104 via the networks 126 may include any data known in the art, including text, images, and sound. Of particular interest in data that can be indexed/referenced by location, as represented by geographically indexed services 132. The geographically indexed services 132 generally provide the ability to search for entities based on the proximity to a particular geographical location. The service 132 may also provide other standard categorization of services, including by business names, type of product or service available, government services, geographical landmarks, sites of interest, etc.

Figure 2:
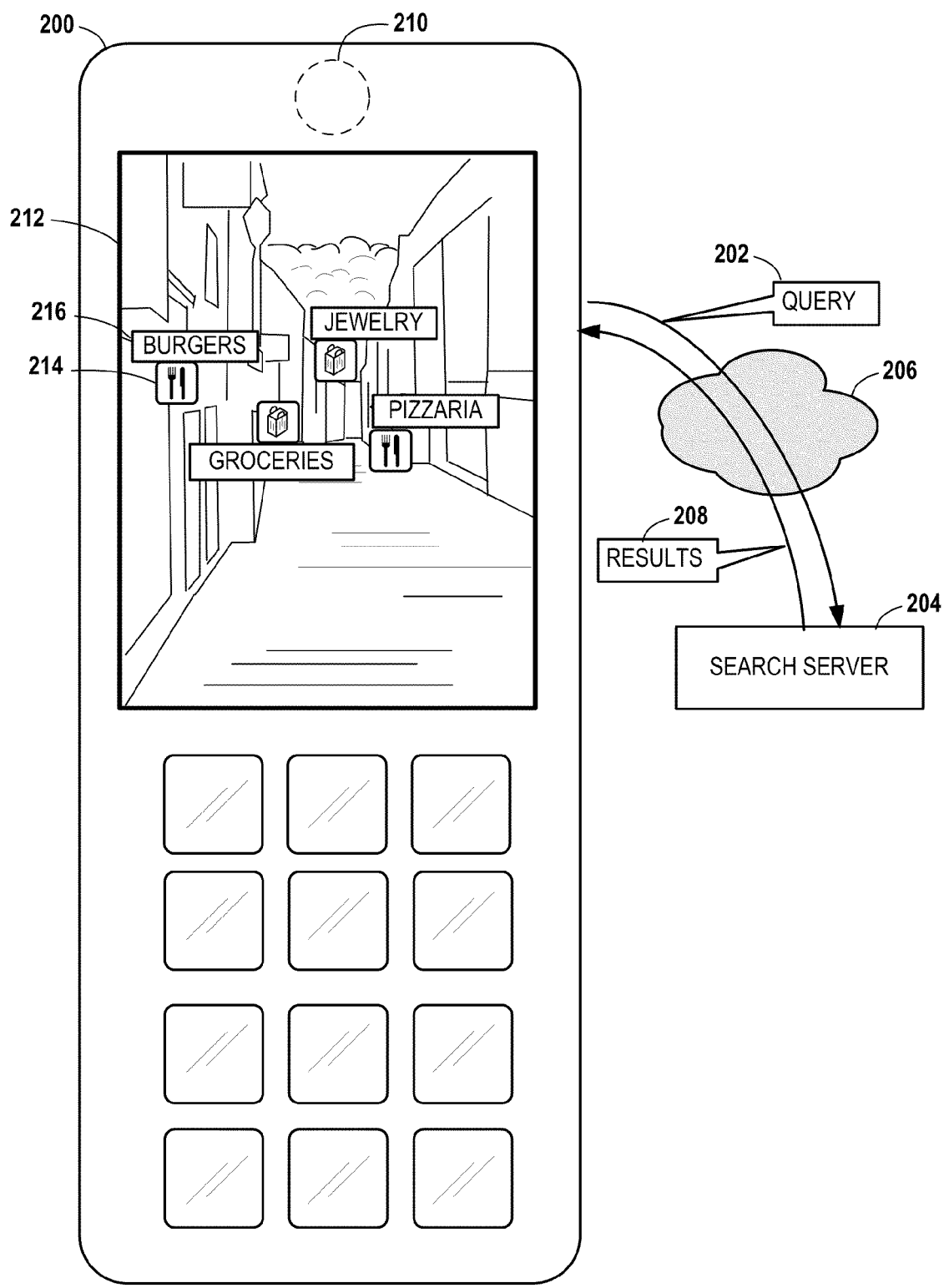
FIG. 2 is a block diagram showing the overlaying of network data onto a mobile device image according to embodiments of the present invention

In one configuration, the location aware applications 124 provide three-dimensional location of data objects using the camera 108 and display 112. An example of this is shown in FIG. 2, which illustrates a mobile device 200 according to an embodiment of the present invention. The mobile device 200 is generally able to find object data related to physical locations and superimpose icons related to that data on a three dimensional camera view. For example, assume the end-user is attempting to find shops and restaurants near his or her current location. The user can begin the search by forming a query 202 (e.g., "find around me: shops and restaurants") on an application of the mobile terminal 200.

The mobile terminal 200 can utilize location sensing devices (e.g., devices 114 in FIG. 1) to determine the current location of the mobile terminal 200. The terminal 200 may include this location data in the query 202, and then send the query to a search server 204 via a network 206. The search server 204 will return results 208 that may include all relevant URLs and location coordinates associated with the URLs. A description of how location based searches may be performed are described in commonly owned patent application Ser. No. 10/822,641 filed Apr. 12, 2004 and entitled "Methods and Apparatus for Geographically Based Web Services" by Hamynen, et al, which is hereby incorporated by reference in its entirety.

The results 208 provided from the server 204 may include additional information related to the URLs that satisfy the query 202. For example, a custom icon or other graphical element may be associated with the URL. The end user may be able to see the results 208 using a standard text or graphical Web page (not shown). However, the user may also be able to utilize a digital camera 210 of the terminal 200 in order to see the query results 208 overlaid on an image of the user's current surroundings. The user may take a static or dynamic (e.g., video stream) picture of the landscape using the camera 210. The image is shown on a display 212 of the device. Part of the results 208 are then overlaid on the display 212 using graphical elements, such as icons 214 and text 216.

The icons 214 may be a general purpose graphic as shown, or may be customized, such as by using a trademark or service mark. The icons 214 and text 216 may include various additional features that increase their usefulness to the user. For example, the characteristic of an icon 214 and text 216 can change depending on the distance of the representative object (e.g., business) from the user. For example, the icon 214 could be displayed smaller if the representative object is farther away. Any combination of size, color, line style, transparency, and the like may be used to indicate distance from the user. The icons 214 and text 216 may also have other enhanced features of Web page objects. For example the icons 214 and text 216 may be user selectable, and contain hyperlinks and descriptive text.

Although the illustrated display 212 and camera 210 are integrated with the mobile device 200, it will be appreciated that alternate camera and display devices may used. For example, the display 212 and/or camera 210 may be integrated into eyewear or headwear, so that the user may not require separate display of the landscape because the landscape is already in the user's current field of view. However, the icons 214 and/or text 216 could be overlaid onto the user's current field of view using, for example, an eyeglass projector or miniature heads-up display. In such a case, the mobile device 200 would not even require a camera 210, although a virtual camera view would still likely be calculated in order to correctly place graphics 214, 216 in the user's field of view.

Such a virtual view could be calculated from location sensing apparatus contained in the mobile device 200 or elsewhere on the person (e.g., eyeglasses).

Figure 3:
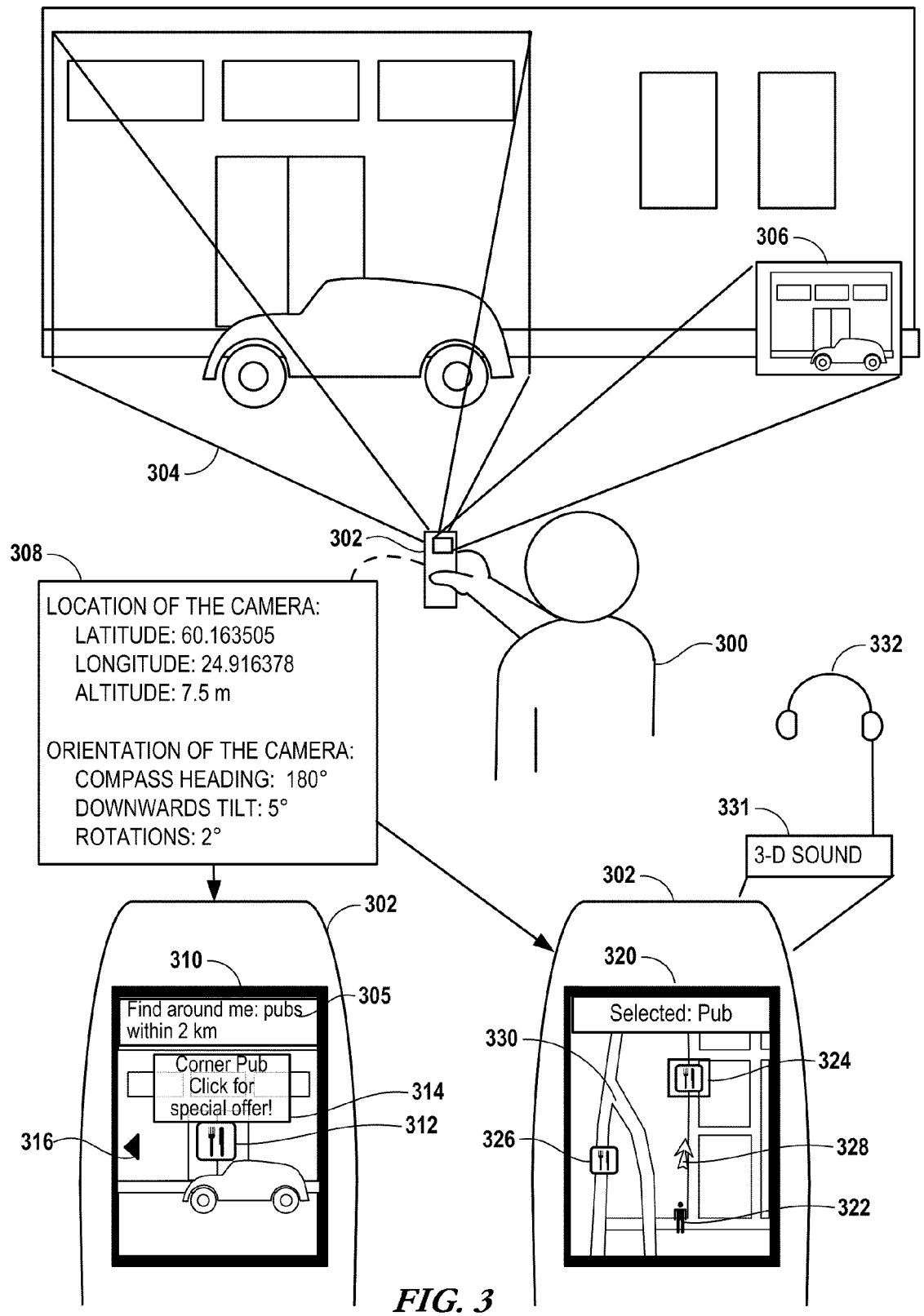
FIG. 3 is a perspective view and block diagram showing additional details related to overlaying network data onto a mobile device image according to embodiments of the present invention.

Additional details related to overlaying network data onto a mobile camera image according to embodiments of the present invention is shown in FIG. 3. Generally, a user 300 points a camera-enabled mobile device 302 in the area of interest. An imaginary bounding volume 304 defines a theoretical space that would be viewable from the mobile device 302 if no objects were blocking the view. The bounding volume 304 is generally pyramidal or conical in shape, and its dimensions can be calculated based on the orientation of the camera device 302 and various aspects of the lens (e.g., F-stop, zoom angle, etc.). Algorithms used to calculate the bounding volume 304 may truncate the base of the volume 304 to a maximum distance dictated by the distances used in geographic searches. For example, if the search (e.g., as shown in search string 305) was for a pub within two kilometers, the volume 304 would extend for two kilometers from the camera device 302.

Positioning data 308, along with known characteristics of the camera lens, can be used to determine the volume 304. Location sensing apparatus of the device may produce the positioning data 308, which may include latitude, longitude, altitude, compass heading, tilt and rotation. The first three measurements of the data 308 fix the origin the volume 304. The latter three measurements are taken relative to the lens of the camera device 302, and fix the orientation of the volume 304. Once volume boundaries are determined, the volume 304 can be used to filter the results of geographically indexed searches and superimpose those results over the camera image 306.

Any items immediately visible within the imaginary volume 304 are included in the resulting scene image 306 and may be displayed in the device 302. The location of the search results can then be overlaid on the scene image 306. Generally, a geographically based search will provide results (e.g., URLs) limited to specific geographic boundaries. These boundaries may be defined in any way, including a circular boundary (e.g., within a 5 km radius from user) and/or a polygon boundary (e.g., within bounding line segments). When displaying such results, the results are further limited to include only those within the current view (e.g., within the bounding volume 304). The remaining results can be mapped within the current view to form a composite view 310. In this example, the final results are shown as an icon 312 and text 314.

When the end-user is pointing the camera device 302 in the correct direction, icons and text 312, 314 representing the search results are visible on the screen 310. The user can select these objects 312, 314 to access the underlying data (e.g., a Web page URL). The user can further limit the display of objects 312, 314, such as by setting some objects to active, and the rest to inactive. If the user has selected a subset of URL's as active, and the camera device 302 is not pointing in the right direction to view some or all of those objects, the user may be shown an indicator such as the arrow 316. The arrow 316 shows the end-user which direction to turn the device 302 in order to see the object representing the active URL on the screen.

Some or all search results in the above example can be shown as icons (e.g., icon 312) in the three-dimensional environment view 310. The user can open Web-pages associated with the icon 312 activating (e.g., clicking) the icon 312. The end-user can also perform additional actions by selecting icon(s) 312 to be active. For example, the user may select an icon 312 in order to be provided with directions to the icon, or to bookmark the URL represented by the icon.

Although the user may provide broad guidelines when initiating a location-based search (e.g., "restaurants"), the resulting number of hits may be too large for effective display in a map view. The system can provide all manner of relevant information for helping the end-user further refine the search. For example, factors such as distance, expected time to reach the object, opening times, keywords, etc., may be used to rank and/or filter results. It may also be beneficial to allow the user to access the search results in a two-dimensional view, as represented by view 320. The two-dimensional view 320 may include an icon 322 representing the user's current location, and icons 324, 326 that represent search results. The two-dimensional view 320 also may be used to provide directions to the user. For example, icon 324 is currently selected (as represented by the box around the icon 324), and the view 320 also shows an arrow 326 directing the user to the target represented by the icon 324.

The two-dimensional view 320 may also include a map background 330. The map background 330 may be implemented using Scaleable Vector Graphics (SVG) or other graphical formats. The data used to form the map background 330 may be stored on the device 302 or may be provided via the network. The map, icons 322, 324, 326 and arrow 326 may be configured to rotate along with rotations of the mobile device 302. The illustrated view 320 may include too much information to be successfully rendered on some device screens. If so, a subset of the illustrated features could be utilized in order to assist the user in navigating to the destination. For example, the view 320 may just show the arrow 328 indicating the required direction of movement to reach the target.

The terminal 302 could also provide additional enhancements to the two- and three-dimensional views 320, 310 in order to assist the user 300 in finding the target location. For example, the terminal could place a respective three-dimensional and two-dimensional animations on the displays 320, 310, the animations illustrating a virtual path for reaching the intended destinations. This animation could be in the form of a moving cursor, and virtual "fly-through," or other action sequence that illustrate the destination path. The user 300 could have the option of saving this path as a browser bookmark or other persistent storage in order to retrace this path at a later time.

The mobile device 302 may be configured to easily switch between the three-dimensional camera viewfinder view 310 and two dimensional map view 320 in order to optimize the user experience. For example, the user may be able to toggle between the views 310, 320 via a single key press. In another arrangement, accelerometers or other level sensing devices could be used to detect when the device 302 is tilted horizontally or vertically, and to automatically switch between the two-dimensional view 320 or the three-dimensional view 310 accordingly.

Although the arrow 326 may be useful in giving the user 300 a visual indication of the direction he or she desires to go, it may not be practical for the user 300 to continuously monitor the display 310, 320. A typical display also consumes a significant portion of the device's available battery power. Therefore it may not be power efficient to require the user 300 to monitor a display 310, 320 for long periods of time. Also, it may be difficult to walk while looking at a display. However, the mobile device 302 typically contains additional user interfaces, and these interfaces may be used to supplement the information provided by the displays 310, 320.

For example, the device 302 may include a 3-D sound module 331 associated with a browser or other network software. Generally, 3-D sound refers to technologies that allow sounds to processed and reproduced so that parts of the resulting sound is perceived as being in a predetermined location. Such 3-D processing is commonly included home theater systems that may use three or more distinct channels that are each routed separate speakers. For purposes of the mobile device 302, however, there are 3-D processing algorithms that allow a simulated multi-channel effect to be experienced in headphones 332. Even standard headphones 332 that process a two-channel audio signal can provide significant left and right spatialization. The 3-D sound module 331 can provide even more effective spatialization effects that cause sound to be perceived in all directions all around the user 300, even using standard headphones 332.

The 3-D sound module 331 can be used in connection with the headphones 332 and a search engine to help finding a target location. This application of sound can be particularly useful where user is searching for locations in an unfamiliar location and does not wish to be distracted by continually having to look down at the mobile device 302. For example, while walking in an unfamiliar city, the user 300 may search for "sushi bar" and the search engine can return the map(s) 310, 320 of the location and play a 3-D sound (e.g., tone or sound effect) in the headphones 332 corresponding to the direction of the nearest sushi bar. The user 300 then places the device 302 in his or her pocket, and walks in the direction of the 3-D sound, which may be repeatedly re-localized as the user's location changes. In this way, the user 300 can enjoy the walk while being gently reminded of the correct destination.

The 3-D module 331 might also provide different sounds for different purposes. For example, if the user wanted to be notified of a local 802.11 wireless hotspot that is detected by the device 302, a different sound that corresponds to the estimated location of the hotspot could be played in the headphones 332. Similarly, the 3-D module 331 could modify characteristics of the sound (e.g., volume, pitch, content) depending on distance from the destination. As with the 2-D and 3-D views 310, 320, the 3-D sound module 331 may use any combination of GPS, digital compass, accelerometers, and other apparatus to determine and update the user's location. The 3-D sound module 331 may be a stand-alone application or an extension to an existing program (e.g., browser plug-in).

One advantage of location detection on mobile devices is that users can use the mobile device 302 as a combination map, compass, and guide book. The user can use the device 302 in order to discover the existence of a desired place, determine the location of the places, and then navigate there. There may be additional location dependent enhancements that may be provided to the mobile device. For example, vendors and service providers may wish to use location services in such devices 302 in order to provide a more unique experience to user, and in this way attract more customers.

Figure 4:
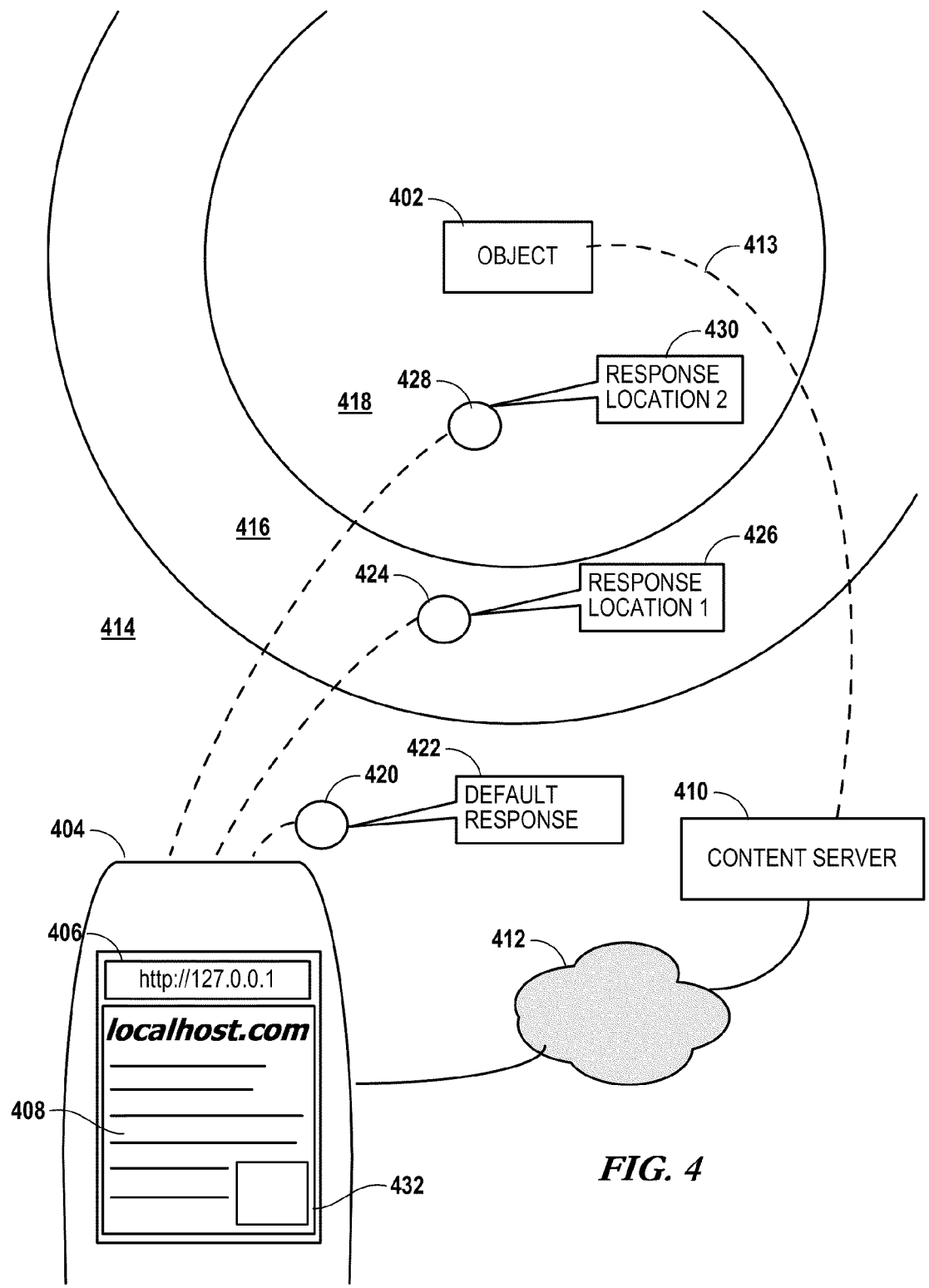
FIG. 4 is a block diagram illustrating the provision of unique network data based on location according to an embodiment of the invention.

One aspect of providing unique network data based on location according to an embodiment of the invention is shown in FIG. 4. A location object 402 is the subject of network content such as a Web page. The location object 402 may be any building, landmark, vending machine, or other object with a determinable location. A location-aware terminal 404 has the ability to determine its own location, at least relative to the location object 402. The terminal 404 is also capable of accessing network data, such as by input of a URL 406. In response to inputting a URL, the terminal 404 downloads or accesses content, as represented by a Web page 408.

The terminal downloads the Web page 408 in using mechanisms that are well known in the art, such as Hypertext Transport Protocol (HTTP) and secure HTTP (HTTPS). Typically, the URL 406 is used to form an HTTP GET or POST request. Other data is also typically included in the request, including a version indicator, type of browser used at the terminal 404, etc. An additional parameter that the terminal 404 can use as part of the request is the location of the terminal 404. The terminal's location can be appended to the request, passed in HTTP headers, or communicated directly or indirectly in other ways known in the art.

The response that the terminal 404 receives from the request may vary based on the location of the terminal 404. In the illustrated example, a content server 410 provides content related to the location object 402 as represented by dashed line 413. The content server 410 receives the requests via a network 412 and forms responses based on the locations (if any) received in the requests. The server can calculate the location of the requestor (e.g., the terminal 404) relative to the location object, and provide custom tailored content depending on the location. In the illustrated example, there are three different zones 414, 416, and 418 that are delimited by concentric circles. If no terminal location is detected, or if the location is in the farthest zone 414 as represented by location 420, then a default response 422 is delivered to the terminal 404.

If the terminal is located in the second zone 416 as represented by location 424, then a different response 426 is presented to the terminal 404. This second zone 416 may represent, for example, a single city or metropolitan area. If the terminal 404 is located in the third and closest zone 418 as represented by location 428, then a third response 430 is presented. This third zone 418 may represent a reasonable walking distance from the location object 402, and the vendor or service provider may want to attract the user's attention with a special offer if the user will pay a visit. As well as providing responses tailored to a single particular zone 414, 416, 418, the content server 410 may provide a combination of responses 420, 424, 426 tailored for two or more of the zones 414, 416, 418. For example, if the object 402 is a store that is part of a chain of stores, the user could see a detailed response 428 describing the nearby store 402 while the user is in zone 418. This response 428 can be combined with a less detailed response 424 describing other store locations within the larger zone 416 (e.g., within the same city).

Not only can the terminal 404 provide location information in a request, but the content server 410 can also provide location information in response to requests. The location information can be added to the content, such as by the insertion of comments or other tags in an HTML document. By parsing this location information added by the server 410, the terminal 404 can limit the display of information to that which has location relevancy some distance from the terminal 404. If the server 410 provides location-based network content, it may be desirable to update network content such as the Web page 408 when the terminal 404 enters new locations related to the Web page 408.

The objects within the Web page 408 may be enabled to detect location information in order to control behavior of the objects. For example, an image 432 in the Web page 408 may include an SVG animation of the location object 402. The image 432 could be configured to change size relative to the distance of the actual location object 402. Note that this behavior may require knowing both the current terminal location and the location of the object 402. While the terminal 404 is changing position, it may not be necessary to download additional behaviors of the image 432, as location changes can be detected internally at the terminal 404. This can conserve the use of network bandwidth.

However, there may be some cases where location information forces the reloading of information over the network 412. For example, if a user transitions from zone 416 to zone 418, the content server 410 may want the terminal to reload the Web page 408 in order to obtain more relevant information. To do this, the content server 410 may include instructions that cause the Web page 408 or other downloadable objects to be re-downloaded. This could work similar to the "refresh" tags that force a browser to reload a page after a certain period of time has elapsed. Instead of time, a "location-refresh" could force a reload based on a distance from a given location.

Location-aware network content behavior may be applied to other network objects. For example, audio objects that are played in the Web page 408 (or via other programs) could change characteristics based on the distance to the target object 402. The characteristics of the sound that could change include content, volume, pitch, etc. Generally, any content that can be rendered via the terminal 404 may have location dependent behavior, including text, video, graphics, sound, vibration, behavior of LEDs, and other indicators, etc. The behavior may be built into the terminal's browser, or may be provided by way of a location objects plug-in. The browser and/or plug-in could handle parsing and interpreting location object information, determining terminal 404 location, and updating network content according the location object guidelines.

In one arrangement, the location information can be placed in the Web page 408 in the form of a Location eXtensible Markup Language (XML) file. The Location XML page could also contain the control information that defines object behavior. Systems and/or software that do not support location control information may show the page content 408 without any control behavior. An example HTML segment and XML document description for updating and image is shown in Listing 1. The image "menu_L1_selected_begin.gif" will change after a 100 meter deviation from the original position is detected. Generally, location-aware objects may be implemented so that there are separate XML files for each object. Each XML file could have a unique location based control command for the respective objects.

Listing 1

Figure 5:
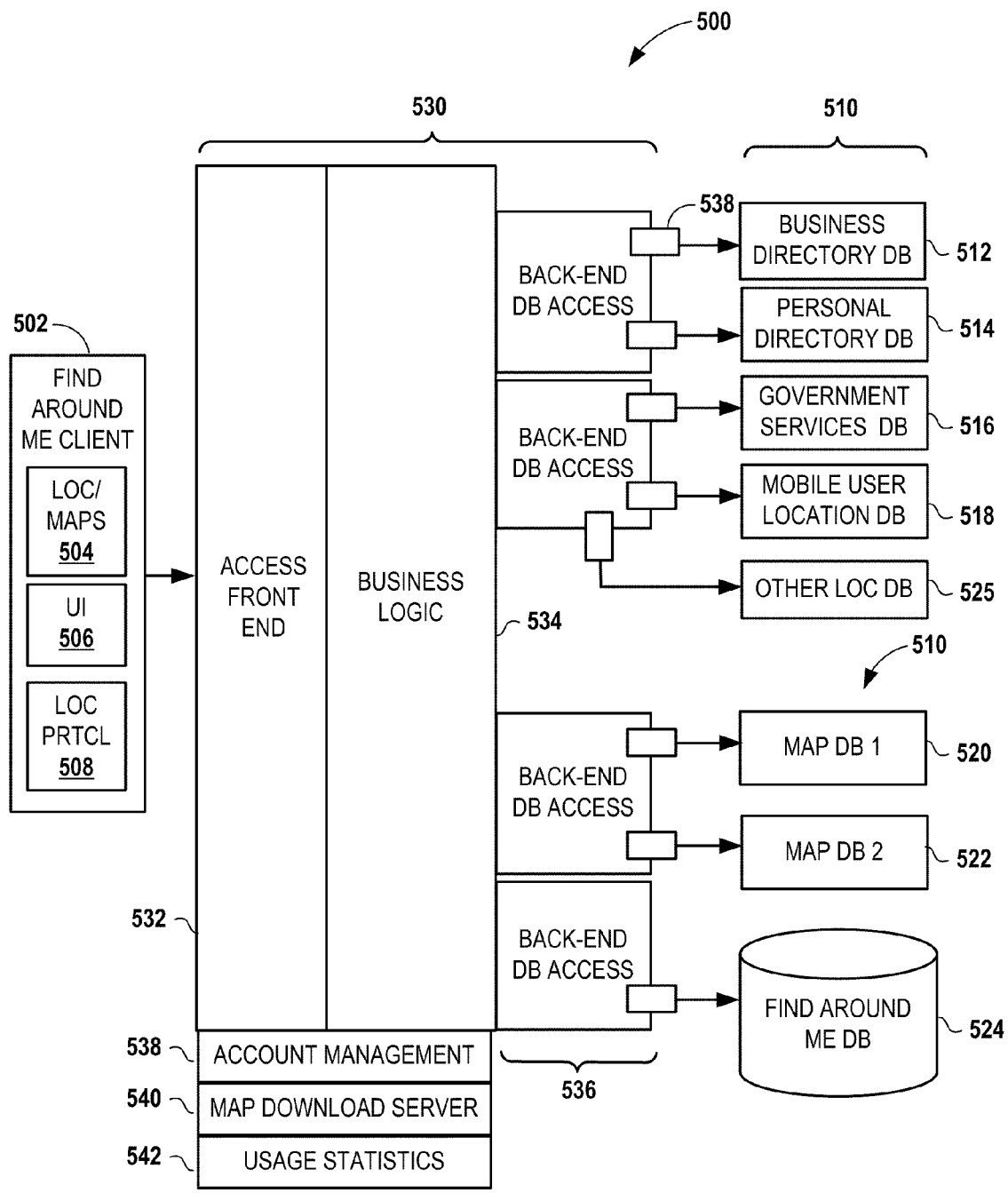
FIG. 5 is a block diagram illustrating a system for providing location-aware content according to an embodiment of the present invention.

----HTML page----
<?xml-location type="text/location"
href="location_XML_1A.loca"?>
<td><img src= "/mnc/framework/skins/mnc/images/
    menu_L1_selected_begin.gif" alt="" width="12"
    height="22" border="0"/>
</td>
----Location XML Document----
<?xml version="1.0"?>
<LOCATION XML>
    <IMG1> src="/mnc/framework/skins/mnc/images/
        menu_L1_selected_begin.gif"
    </IMG1>
    <LOCATION CNTR CMD1>deviation 100m
    </ LOCATION CNTR CMD1 >
    <CNTR CMD1 UPDATE>
        src="/mnc/framework/skins/mnc/images
        /menu_L1_selected_100m.gif"
    </CNTR CMD1 UPDATE >
</LOCATION XML>
©2005, Nokia Corporation Generally, the systems described above provide location-aware content for user applications, particularly for mobile device applications. A more particular system 500 for providing this content according to an embodiment of the present invention is shown in FIG. 5. Client software 502 is adapted to run on end-user processing equipment such as a mobile terminal. The client software 502 includes a positioning/mapping module 504 that allows the software 502 to determine current location, and may provide other mapping and location functions.

The client software 502 contains a user interface 506 for accessing location-aware databases 510. A protocol module 508 allows the client 502 to direct searches to location aware databases 510. The location-aware databases 510 can be configured to reply to queries based on object names, position coordinates, and other information such as phone numbers, addresses, icons, images of the destination place or object, etc. The responses provided by the databases 510 may include a URL which identifies a network path where the localized Web content can be found. Queries can also be directed to particular databases 510 based on a category selection. For example, databases 510 may be include specialized databases such as business directories 512, personal directories 514, government services 516, locations of other mobile users 518, map services 520, 522, personalized databases 524 customized for each client 502, and any other database 525.

The personalized database 524 may be included as part of the network infrastructure (as illustrated) and/or be included on the same device as the client 502. The personalized database 524 may be automatically updated with content from the location-aware databases 510. For example when the end-user travels to a new city, the client 502 can detect the new location and use the personalized database 524 to determine if related database links are available for the present location. The client 502 may also query the end-user whether to accept new local database links to the client user interface 506. If the new services are accepted, the client 502 can download new links to the user interface 506 and place icons and other graphics accordingly. For example, the icons may represent banks, teller machines, vending machines, or other services of interest to the end-user. The client software 502 maps these graphics on 2-D or 3-D maps, as described elsewhere herein.

The client software 502 may access the databases 510 directly or indirectly, using such tools as HTTP, Simple Object Access Protocol (SOAP), Active Server Pages (ASP), PHP, or any other network-based data access protocol. In the illustrated example, the client software 502 interfaces with a location-aware service 530. The service 530 may be implemented on any number of network server devices. The service 530 contains a generic front end access interface 532 that may be utilized by various types of client software 502. Again, technologies such as XML, SOAP, ASP, PHP may be used by the access interface 532. The access interface 532 may be capable of handling a wide variety of data formats and protocols for finding and presenting location-dependent information. For example, the access interface 532 may be used to provide data from location aware databases 510 in such formats as Web pages, XML document, text documents, binary objects (e.g., programs, ActiveX controls, Java Beans), email, text messages, instant messages, streaming media, etc.

The access interface 532 communicates with business logic 534. The business logic decodes requests and formats replies. The business logic 534 acts as an intermediary between the access interface 532 and back-end database interfaces 536. The back-end database interfaces 536 are lower level functional units capable of providing a uniform method of accessing the diverse databases 510. The back-end database interfaces 536 may include customized adaptors (e.g., adapter 538) that are tailored for particular databases 510. For example, the adapter 538 is customized for data structures and access protocols used by the business directory database 512.

The location aware service 530 may include additional services needed by clients 502 and other location-aware entities. There can be functional modules such as account management 538, map download services 540, and usage statistics 542. The usage statistic service 542 may track site accesses to determine advertising effectiveness, determine correlation between search queries and results, etc.

Figure 6:
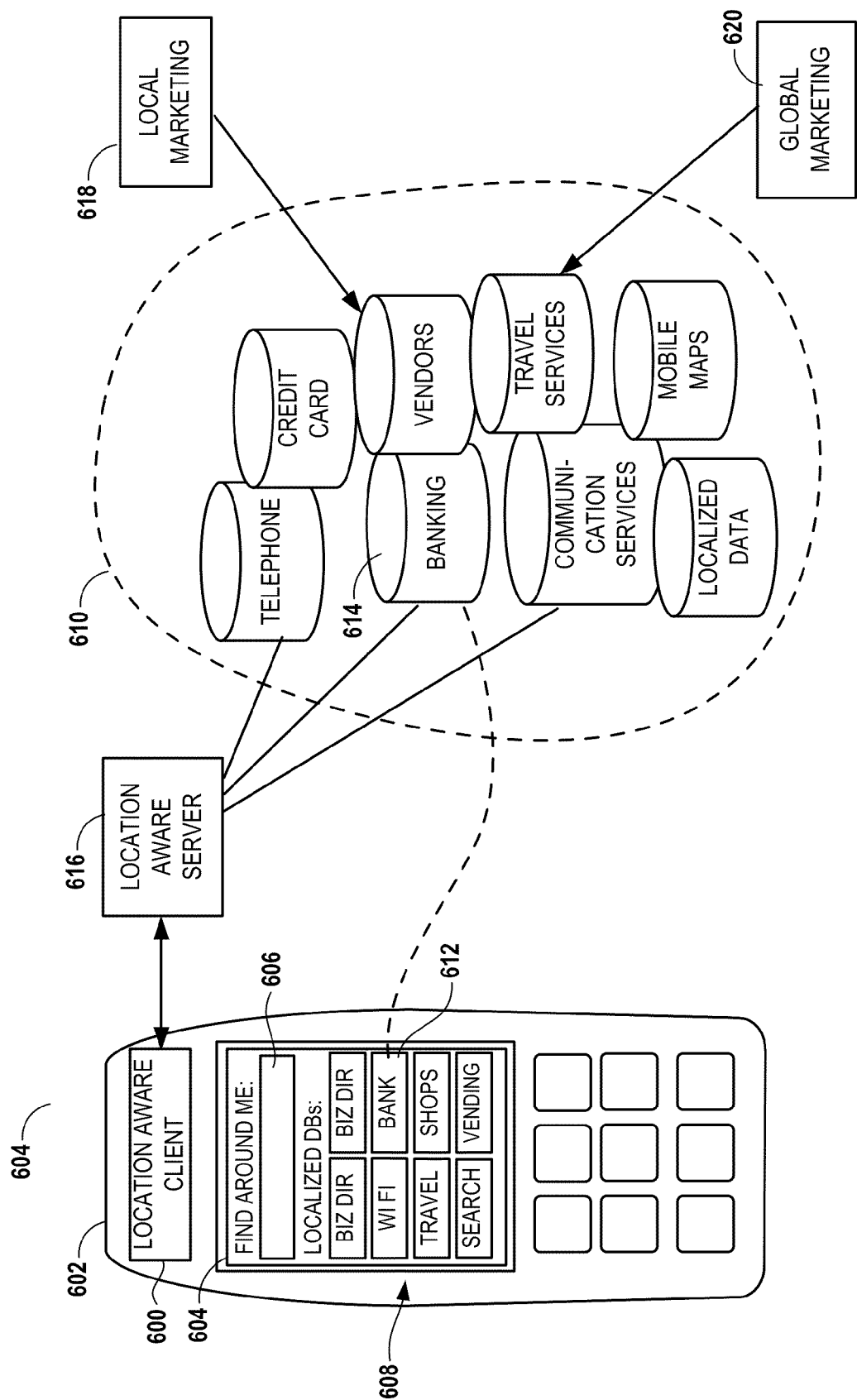
FIG. 6 is a block diagram illustrating another location-aware system according to an embodiment of the present invention.

A more particular example of a location-aware system according to an embodiment of the present invention is shown in FIG. 6. A location aware client application 600 runs in a mobile terminal 602, and is capable of detecting the location of the terminal 602. The application 600 includes a user interface 604 that is accessible by the terminal's user. The user interface 604 may include an input field 606 for entering search queries directed to one or more localized databases 610. The user interface 604 may also include links 608 for accessing a particular localized database 610.

The links 608 are a quick and easy tool for finding local objects based on pre-defined categories. For example, selecting a "bank" link 612 may cause a query to be sent to a banking database 614 in order to find bank branches or teller machines near the location of the terminal 602. Generally, the application 602 communicates with the databases 610 via a location-aware server 616, which provides a common interface for all location-aware services.

The location-aware databases 610 may be populated using an independent search entity, such as a search engine. The databases 610 may also be supplemented by local marketing 618 and global marketing 620 entities in order to increase the visibility of localized services to mobile device users. Generally, the marketing entities 618, 620 have an incentive to ensure the accuracy of the location data, and therefore can provide increased reliability over methods such as identifying and parsing addresses via a search engine.

Many types of apparatuses may be able to operate location-aware client applications as described herein. Mobile devices are particularly useful in this role. In reference now to FIG. 7, an example is illustrated of a representative mobile computing arrangement 700 capable of carrying out operations in accordance with embodiments of the invention. Those skilled in the art will appreciate that the exemplary mobile computing arrangement 700 is merely representative of general functions that may be associated with such mobile devices, and also that landline computing systems similarly include computing circuitry to perform such operations.

The processing unit 702 controls the basic functions of the arrangement 700. Those functions associated may be included as instructions stored in a program storage/memory 704. In one embodiment of the invention, the program modules associated with the storage/memory 704 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 700 via data signals, such as being downloaded electronically via one or more networks, such as the Internet and an intermediate wireless network(s).

The mobile computing arrangement 700 includes hardware and software components coupled to the processing/control unit 702 for performing network data exchanges. The mobile computing arrangement 700 may include multiple network interfaces for maintaining any combination of wired or wireless data connections. In particular, the illustrated mobile computing arrangement 700 includes wireless data transmission circuitry for performing network data exchanges.

This wireless circuitry includes a digital signal processor (DSP) 706 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 708, generally coupled to an antenna 710, transmits the outgoing radio signals 712 and receives the incoming radio signals 714 associated with the wireless device.

The mobile computing arrangement 700 may also include an alternate network/data interface 716 coupled to the processing/control unit 702. The alternate network/data interface 716 may include the ability to communicate on secondary networks using any manner of data transmission medium, including wired and wireless mediums. Examples of alternate network/data interfaces 716 include USB, Bluetooth, Ethernet, 802.11 Wi-Fi, IRDA, etc. The processor 702 is also coupled to user-interface elements 718 associated with the mobile terminal. The user-interface 718 of the mobile terminal may include, for example, a display 720 such as a liquid crystal display and a camera 722. Other user-interface mechanisms may be included in the interface 718, such as keypads, speakers, microphones, voice commands, switches, touch pad/screen, graphical user interface using a pointing device, trackball, joystick, etc. These and other user-interface components are coupled to the processor 702 as is known in the art.

Other hardware coupled to the processing unit 702 includes location sensing hardware 724. Generally, the location sensing hardware 724 allows the processing logic of the arrangement 700 to determine absolute and/or relative location and orientation of the arrangement. The location may be expressed in any known format, such as lat/lon and UTM. The orientation may be expressed using angles of a component of the arrangement (e.g., lens of the camera 722) relative to known references. For example, pitch and roll measurements may be used to define angles between the component and the earth's surface. Similarly, a heading measurement may define an angle between the component and magnetic north. The location sensing hardware 724 may include any combination of GPS receivers 726, compasses 728, accelerometers 730, and proximity sensors 732, and any other sensing technology known in the art.

The program storage/memory 704 typically includes operating systems for carrying out functions and applications associated with functions on the mobile computing arrangement 700. The program storage 704 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 704 of the mobile computing arrangement 700 may also include software modules for performing functions according to embodiments of the present invention.

In particular, the program storage/memory 704 includes a core functionality module 734 that provides some or all of the location-aware client functionality as described hereinabove. The core functionality 734 may be used by a standalone location-aware client application 736. The core functionality 734 may also be included as a location-aware plug-in module 738. The plug-in module 738 may be used to extend the functionality of other applications such as a browser 740 or other networking applications 742. These applications 740, 742 have respective generic plug-in interfaces 744, 746 that allow third parties to extend the functionality of the core application 740, 742.

The core functionality module 732 includes a location-aware network protocol module 748 that allows the arrangement 700 to download, upload, search for, index, and otherwise process network content that includes object locations. This location data may be exchanged with other entities via a network 750. The location content may be provided, for example by a Web server 752 and/or network accessible database 754. The location-aware network protocol module 748 may also determine locations of the arrangement 700 via a location/orientation module 756. The location/orientation module 756 is adapted to detect location and/or orientation from location sensing hardware 724 and perform transformations in order to present location and orientation information into a common format for other components of the core functionality module 734.

Part of the functionality included in the core module 734 relates to displaying search results and other location-specific data via the user interface hardware 718. A multimedia framework module 758 includes the capability to capture and display data relevant to presenting location-aware searches to users. For example, a digital imaging module 760 may be able to capture images via the camera 722 and display the images in the display 720. These images can be synchronized with location/orientation data from the location/orientation module 756. The digital imaging module 760 can use the captured images and location data to overlay one or more location objects 761 onto the image. The location objects 761 typically correspond to results of network data searches conducted via the network protocol module 748.

The digital imaging module 760 may also be configured to access locally or remotely stored maps via a mapping module 762. These maps can be overlaid with (e.g., placed on backgrounds of) the two-dimensional view, or be formatted in a perspective format and overlaid on top of three-dimensional images taken via the camera 722. The digital imaging module 760 can also control toggling between two-dimensional and three-dimensional views based on orientation data obtained from the location/orientation module 756.

The location objects 761 generally represent search results or other data obtained from the network 750 via the network protocol module 748. The objects 761 may be presented to the user as text, graphics, sounds, tactile feedback, and any other user output interface element known in the art. The objects 761 may be the result of queries that are input manually by the user, or the result of predefined categorical searches.

Another way the arrangement 700 may form queries is to utilize an optical character recognition (OCR) module 764 to detect information captured via the camera 722 or other device. The OCR module 764 can interface with the digital imaging module to read characters from video streams or still images. When the OCR module 764 detects characters on the video/images, the characters could be used as inputs to find local Web pages of other content via network protocol module 748. The matches found via the OCR module 764 could also be placed on composite images produced by the imaging module 760. Although the OCR module 764 typically captures text data, it will be appreciated that the module 764 may be adapted for related image recognition tasks, such as recognizing logos, landmarks, locations, etc.

The digital imaging module 760 may also render various graphics that guide the user to a desired location. One example of this is to place arrows or animations n two-dimensional or three-dimensional views to indicate where the user should go. The imaging module 760 can also interface with other input/output modules to perform similar functions. For example, the arrangement could play spatially oriented sounds to the user the user via a 3-D audio module 766 in order to direct the user to the final location. The digital imaging module 760 may also control the behavior of location objects 761 based on location updates received via location/orientation module 756. For examples, a particular object 761 may be an icon that changes size, color, transparency, etc., depending on a distance of the arrangement 700 from the target that the icon represents.

Figure 7:
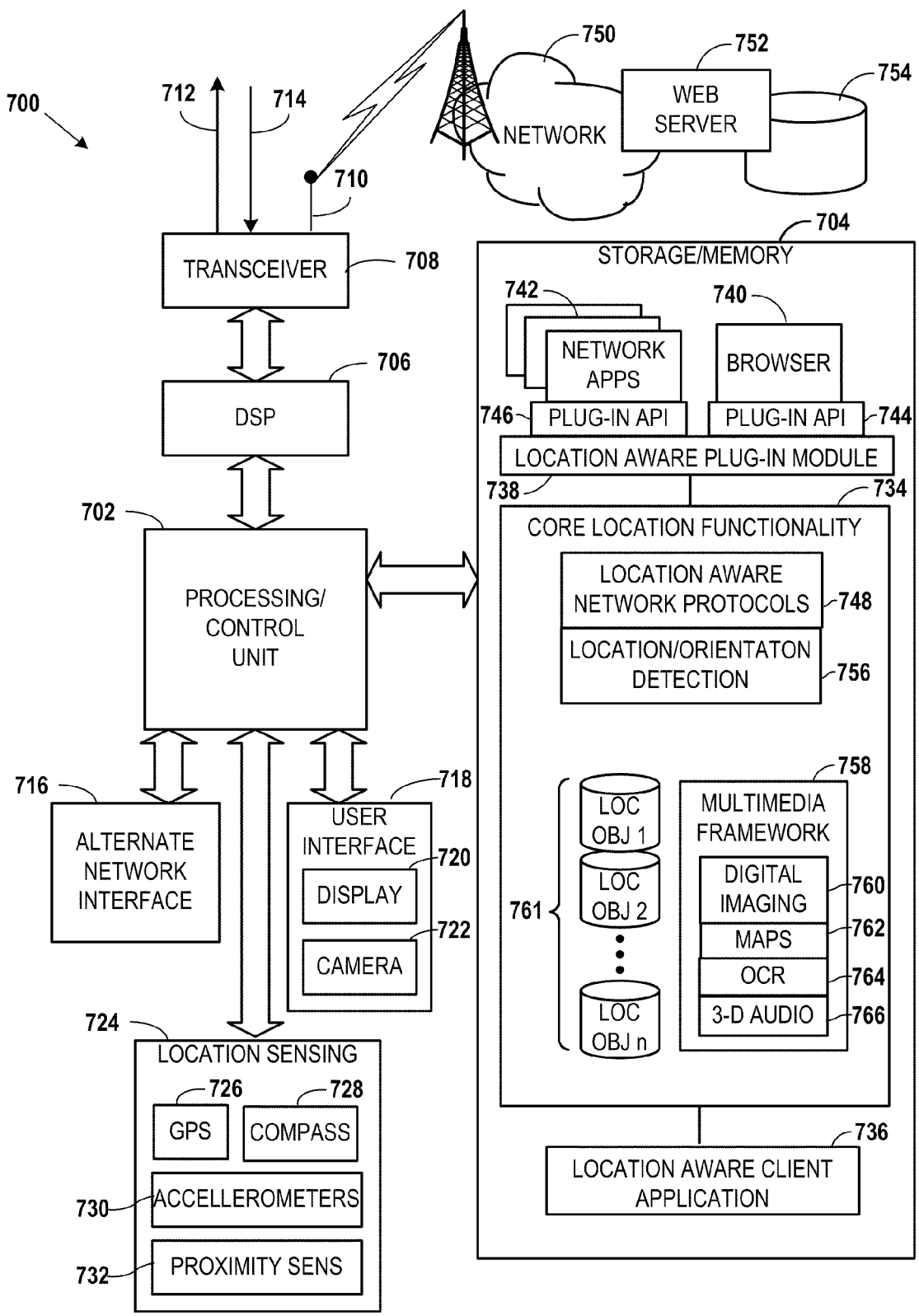
FIG. 7 is a block diagram illustrating a representative mobile computing arrangement capable of carrying out operations in accordance with embodiments of the invention.

The mobile computing arrangement 700 of FIG. 7 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Figure 8:
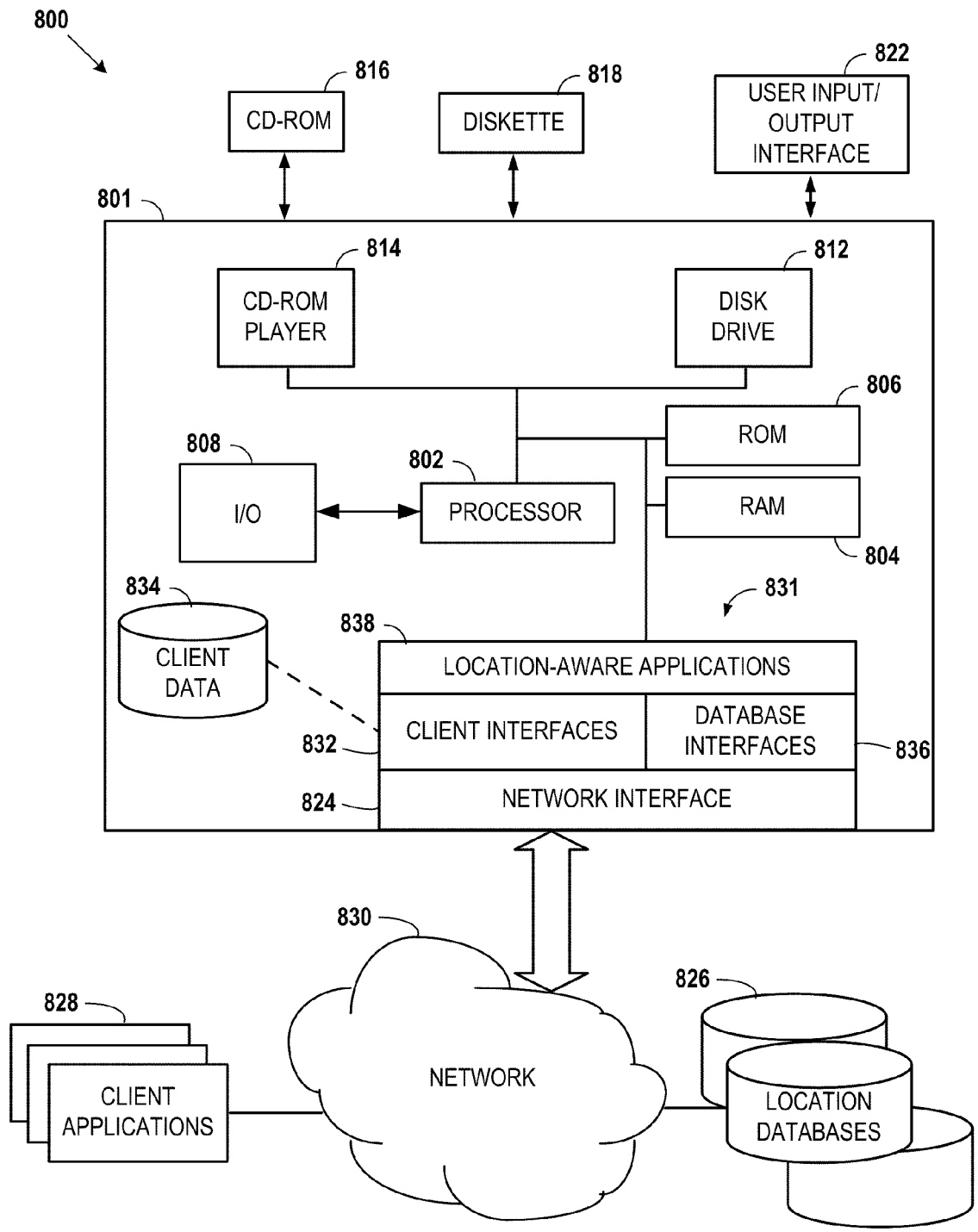
FIG. 8 is a block diagram illustrating an example computing structure suitable for providing location-aware services according to embodiments of the present invention.

The location aware client applications may be able to detect object locations using standard search engine techniques. For example, a search engine may be able to parse addresses from Web pages and associate a geocoordinate with that address. However, a more complete and accurate database of objects and associated locations can be obtained by providing specialized databases that associate the location of particular objects (e.g., building, landmarks) with Web addresses. One way to do this, as described hereinabove, is to provide one or more network components that centralize and standardize various types of location-referenced data. FIG. 8 shows an example computing structure 800 suitable for providing location-aware services according to embodiments of the present invention.

The computing structure 800 includes a computing arrangement 801. The computing arrangement 801 may include custom or general-purpose electronic components. The computing arrangement 801 includes a central processor (CPU) 802 that may be coupled to random access memory (RAM) 804 and/or read-only memory (ROM) 806. The ROM 806 may include various types of storage media, such as programmable ROM (PROM), erasable PROM (EPROM), etc. The processor 802 may communicate with other internal and external components through input/output (I/O) circuitry 808. The processor 802 carries out a variety of functions as is known in the art, as dictated by software and/or firmware instructions.

The computing arrangement 801 may include one or more data storage devices, including hard and floppy disk drives 812, CD-ROM drives 814, and other hardware capable of reading and/or storing information such as DVD, etc. In one embodiment, software for carrying out the operations in accordance with the present invention may be stored and distributed on a CD-ROM 816, diskette 818 or other form of media capable of portably storing information. These storage media may be inserted into, and read by, devices such as the CD-ROM drive 814, the disk drive 812, etc. The software may also be transmitted to computing arrangement 801 via data signals, such as being downloaded electronically via a network, such as the Internet. The computing arrangement 801 may be coupled to a user input/output interface 822 for user interaction. The user input/output interface 822 may include apparatus such as a mouse, keyboard, microphone, touch pad, touch screen, voice-recognition system, monitor, LED display, LCD display, etc.

The computing arrangement 801 may be coupled to other computing devices via networks. In particular, the computing arrangement includes a network interface 824 for interacting with location reference databases 826 and client applications 828 (e.g., mobile terminal software) via a network 830. The network interface 824 may include a combination of hardware and software components, including media access circuitry, drivers, programs, and protocol modules.

The computing arrangement 801 includes processor executable instructions 831 for carrying out tasks of the computing arrangement 801. These instructions include client interfaces 832 capable of communicating with client applications 828. The client interfaces 832 are generally capable of receiving search queries, delivering search results, determining client capabilities and locations, etc. The client interfaces 832 may interface with a client database 834 for storing data related to client applications 828, including preferences, capabilities, custom search queries, usage statistics, etc. One or more location-aware applications 838 may control the business logic for communicating with client applications 828. The location-aware applications 838 receive queries, execute searches on location databases 826, format results for the client applications 828, etc. The location-aware applications 838 may utilize one or more database interfaces 836 for communicating with the location databases 826.

The computing structure 800 is only a representative example of network infrastructure hardware that can be used to provide location-based services as described herein. Generally, the functions of the computing structure 800 can be distributed over a large number of processing and network elements, and can be integrated with other services, such as Web services, gateways, mobile communications messaging, etc.

Figure 9:
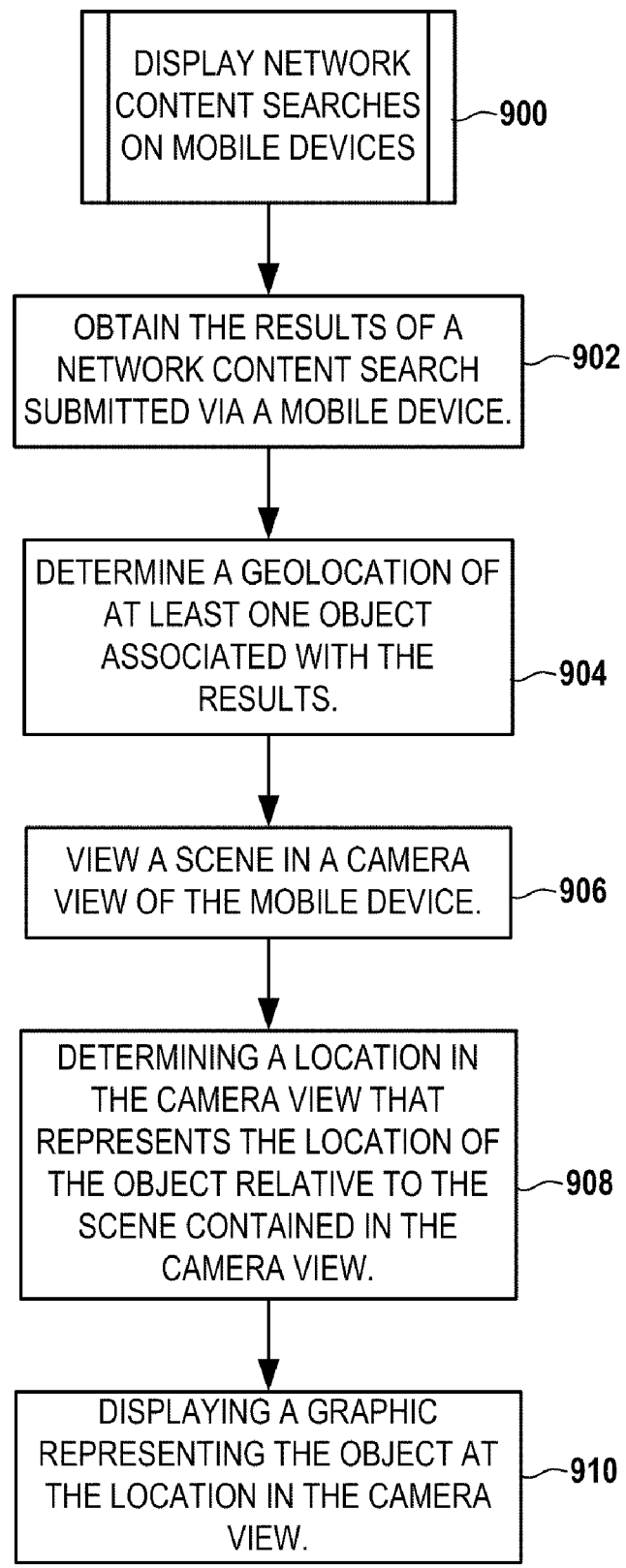
FIG. 9 is a flowchart showing steps in providing network content search results to mobile devices according to embodiments of the present invention.

In reference now to FIG. 9, a flowchart illustrates a procedure 900 for displaying network content searches on mobile devices according to embodiments of the present invention. The procedure involves obtaining (902) results of a network content search via a mobile device. A geolocation of at least one object associated with the results of the network content search is obtained (904). A scene is viewed (906) in a camera view of the mobile device. A virtual location is determined (908) in the camera view. The virtual location represents the actual location of the object relative to the scene contained in the camera view. A graphic representing the object at the location in the camera view is then displayed (910).

Figure 10:
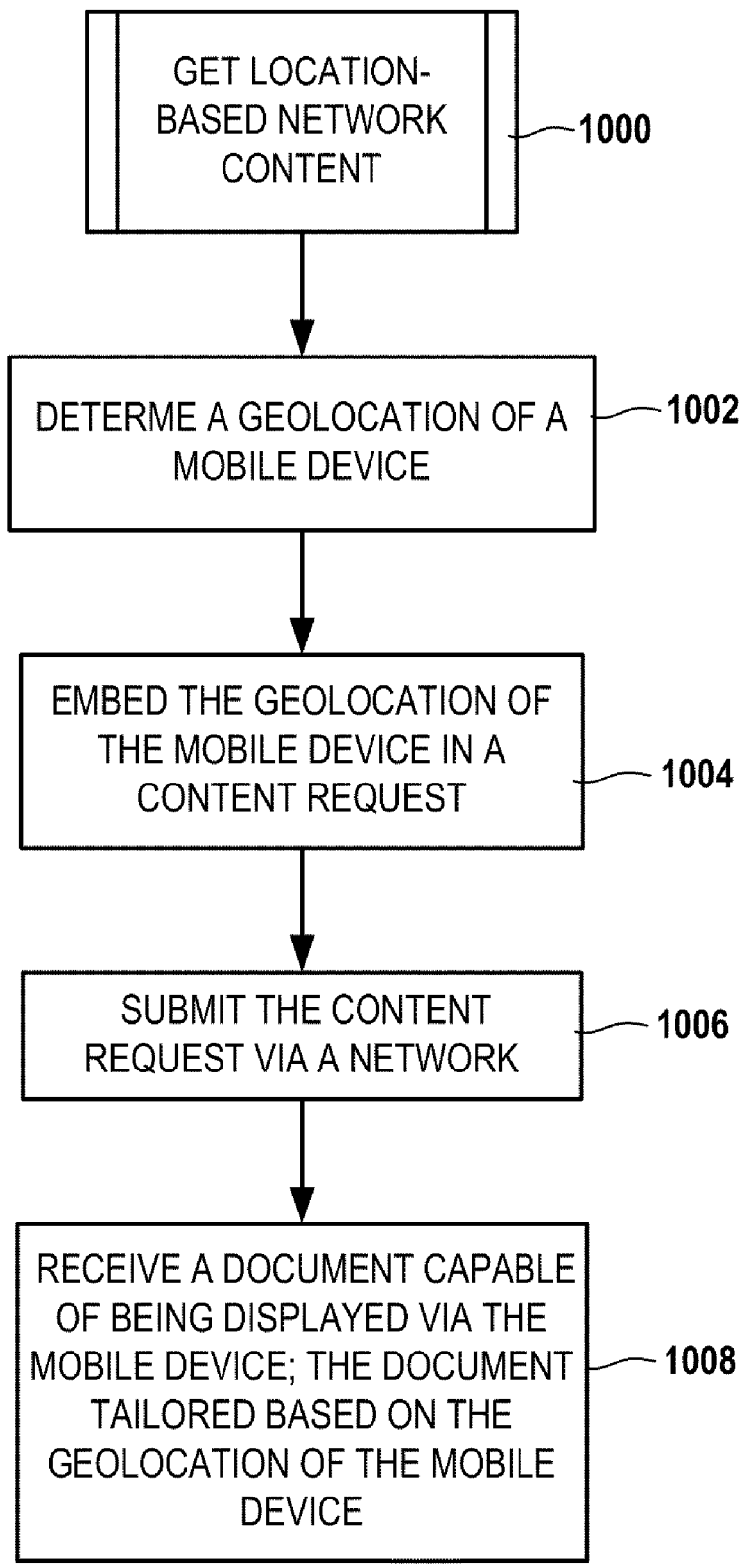
FIG. 10 is a flowchart showing steps in location based network content according to an embodiment of the present invention.

In reference now to FIG. 10, a flowchart illustrates a procedure 1000 for getting location-based network content, such as via a mobile device. A geolocation of the mobile device is determined (1002), and the geolocation is embedded (1004) in a content request. Embedding (1004) the geolocation may involve, for example, placing the geolocation in the header or body of an HTTP request. The content request is submitted (1006) via a network, and, in response, a document is received that is capable of being displayed via the mobile. The document is tailored based on the geolocation of the mobile device.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
causing at least in part, receiving of network content at a mobile device in response to a network search query, wherein the network content is based at least in part on a geolocation of the mobile device;
determining, based at least in part on a second geolocation associated with at least one object described in the network content, a virtual location in the camera view associated with the actual location of the object relative to a scene contained in the camera view; and
causing at least in part, displaying via the mobile device a graphic representing the object at the virtual location in the camera view, wherein displaying the graphic representing the object comprises differentiating a display characteristic of the graphic based on a distance of the object from the mobile device.

2. The method of claim 1, further comprising:
measuring the geolocation of the mobile device via the mobile device; and
including an indicator of the geolocation of the mobile device in the network search query, wherein the network content is based on the indicator included in the network search query.

3. The method of claim 2, wherein the network search query further includes geographic boundary data used for further filtering the network content.

4. The method of claim 3, wherein the geographic boundary data comprises a bounding volume determined at least in part based on the camera view.

5. The method of claim 3, wherein the geographic boundary data comprises a distance from the mobile device.

6. The method of claim 1, wherein the display characteristic comprises any combination of size, color, line style, and transparency of the graphic.

7. The method of claim 1, wherein the display characteristic comprises a level of detail used to describe the object that is represented by the graphic.

8. The method of claim 1, wherein the display characteristic comprises an indicator of a special offer by a vendor associated with the object that is represented by the graphic.

9. The method of claim 1, further comprising defining two or more zones, each zone being differentiated based on distances from the mobile device, and wherein the display characteristic of the graphic is differentiated based on the object being located in a selected one of the zones.

10. An apparatus comprising:
at least one processor; and
at least one memory including computer program instructions;
the at least one memory and the computer program instructions configured to, with the at least one processor, cause the apparatus at least to:
receive network content in response to a network search query, wherein the network content is based at least in part on a geolocation of the apparatus;
determining, based on a second geolocation associated with at least one object described in the network content, a virtual location in the camera view that associated with the actual location of the object relative to a scene contained in the camera view; and
display a graphic representing the object at the virtual location in the camera view, wherein displaying the graphic representing the object comprises differentiating a display characteristic of the graphic based on a distance of the object from the apparatus.

11. The apparatus of claim 10, wherein the at least one memory and the computer program instructions, with the at least one processor, further cause the apparatus to:
measure the geolocation of the apparatus; and
include an indicator of the geolocation of the apparatus in the network search query, wherein the network content is based on the indicator included in the network search query.

12. The apparatus of claim 11, wherein the network search query further includes geographic boundary data used for further filtering the network content.

13. The apparatus of claim 12, wherein the geographic boundary data comprises a bounding volume determined at least in part based on the camera view.

14. The apparatus of claim 12, wherein the geographic boundary data comprises a distance from the apparatus.

15. The apparatus of claim 10, wherein the display characteristic comprises any combination of size, color, line style, and transparency of the graphic.

16. The apparatus of claim 10, wherein the display characteristic comprises a level of detail used to describe the object that is represented by the graphic.

17. The apparatus of claim 10, wherein the display characteristic comprises an indicator of a special offer by a vendor associated with the object that is represented by the graphic.

18. The apparatus of claim 10, wherein the at least one memory and the computer program instructions, with the at least one processor, further cause the apparatus to define two or more zones, each zone being differentiated based on distances from the apparatus, and wherein the display characteristic of the graphic is differentiated based on the object being located in a selected one of the zones.

19. A non-transitory computer-readable storage medium having instructions stored thereon which are executable by a processor to cause an apparatus at least to:
receive network content in response to a network search query, wherein the network content is based at least in part on a geolocation of the apparatus;
determining, based on a second geolocation associated with at least one object described in the network content, a virtual location in the camera view that associated with the actual location of the object relative to a scene contained in the camera view; and
display a graphic representing the object at the virtual location in the camera view, wherein displaying the graphic representing the object comprises differentiating a display characteristic of the graphic based on a distance of the object from the apparatus.

20. The non-transitory computer-readable storage medium of claim 19, wherein the instructions stored are further executable to cause the apparatus to:
measure the geolocation of the apparatus; and
include an indicator of the geolocation of the apparatus in the search query, wherein the network content is based on the indicator included in the network search query.

21. The non-transitory computer-readable storage medium of claim 20, wherein the network search query further includes geographic boundary data used for further filtering the network content.

* * * * *